Jan. 26, 1932. W. B. STOUT 1,842,736
AIR AND WATER CRAFT AND METHOD OF MAKING THE SAME
Original Filed Dec. 23, 1918  4 Sheets-Sheet 1
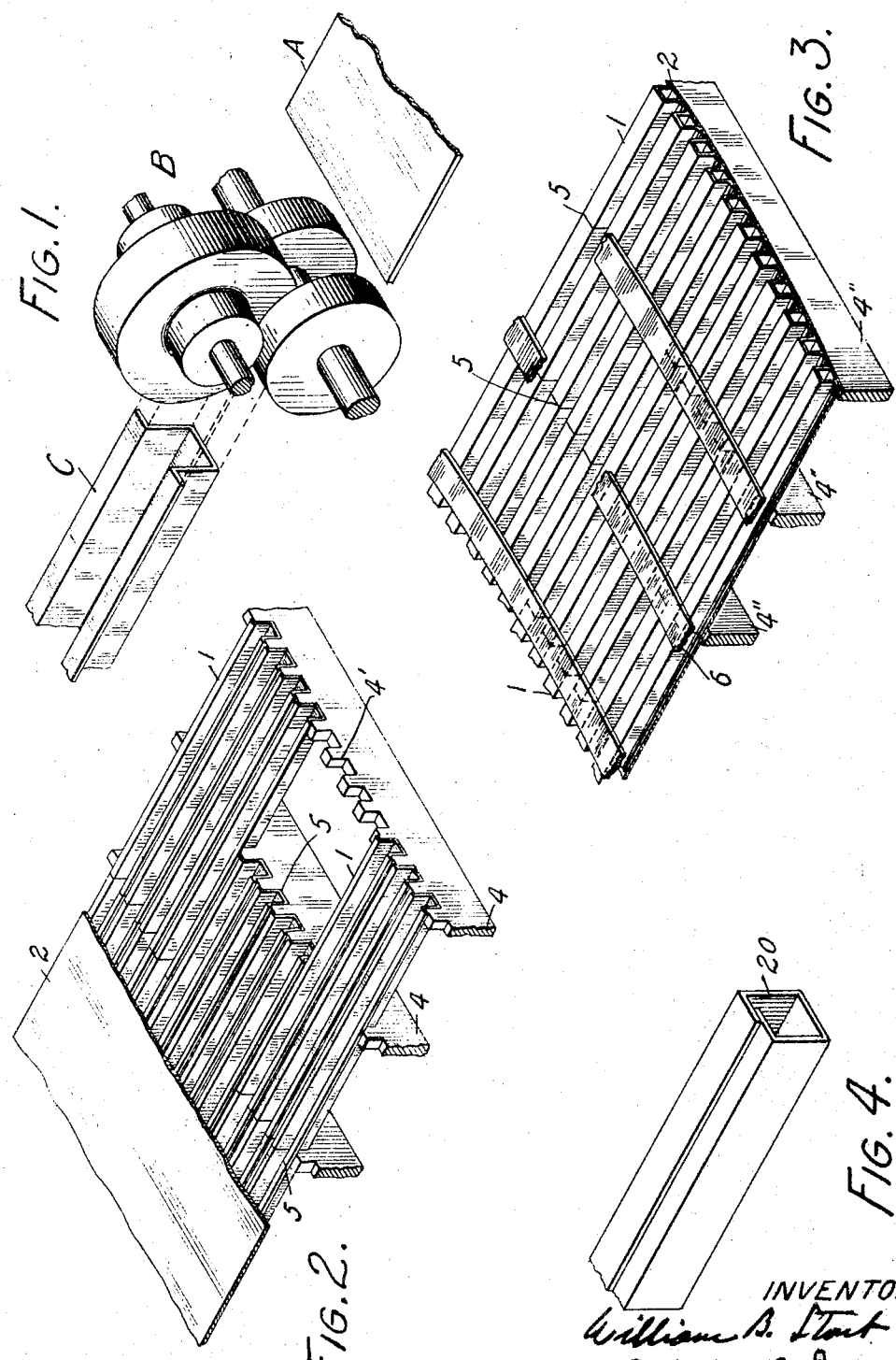
INVENTOR
William B. Stout
By Clifford E. Dunn
ATTORNEY

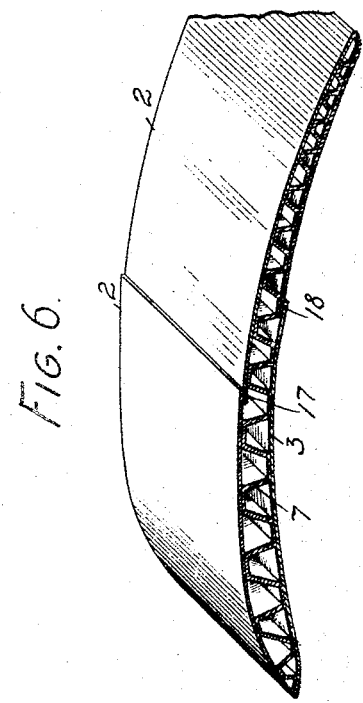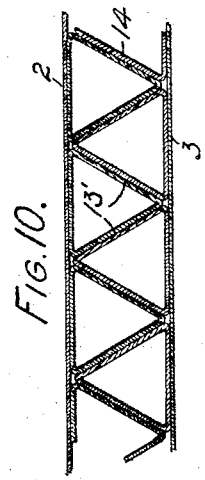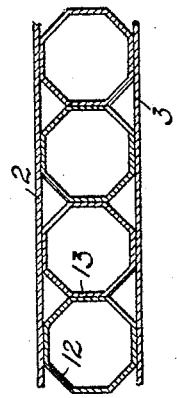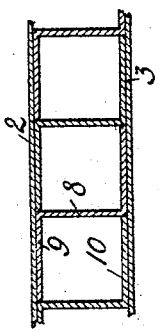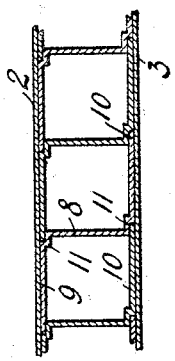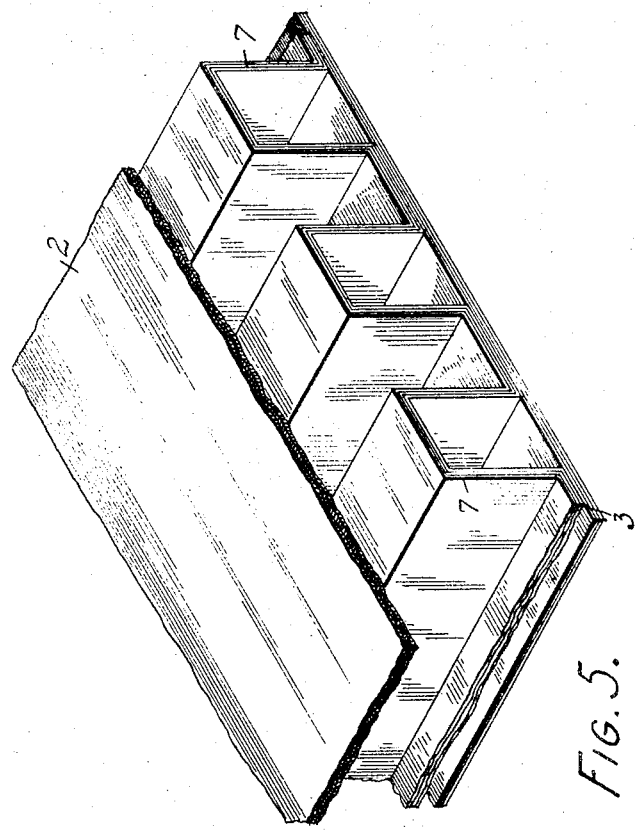

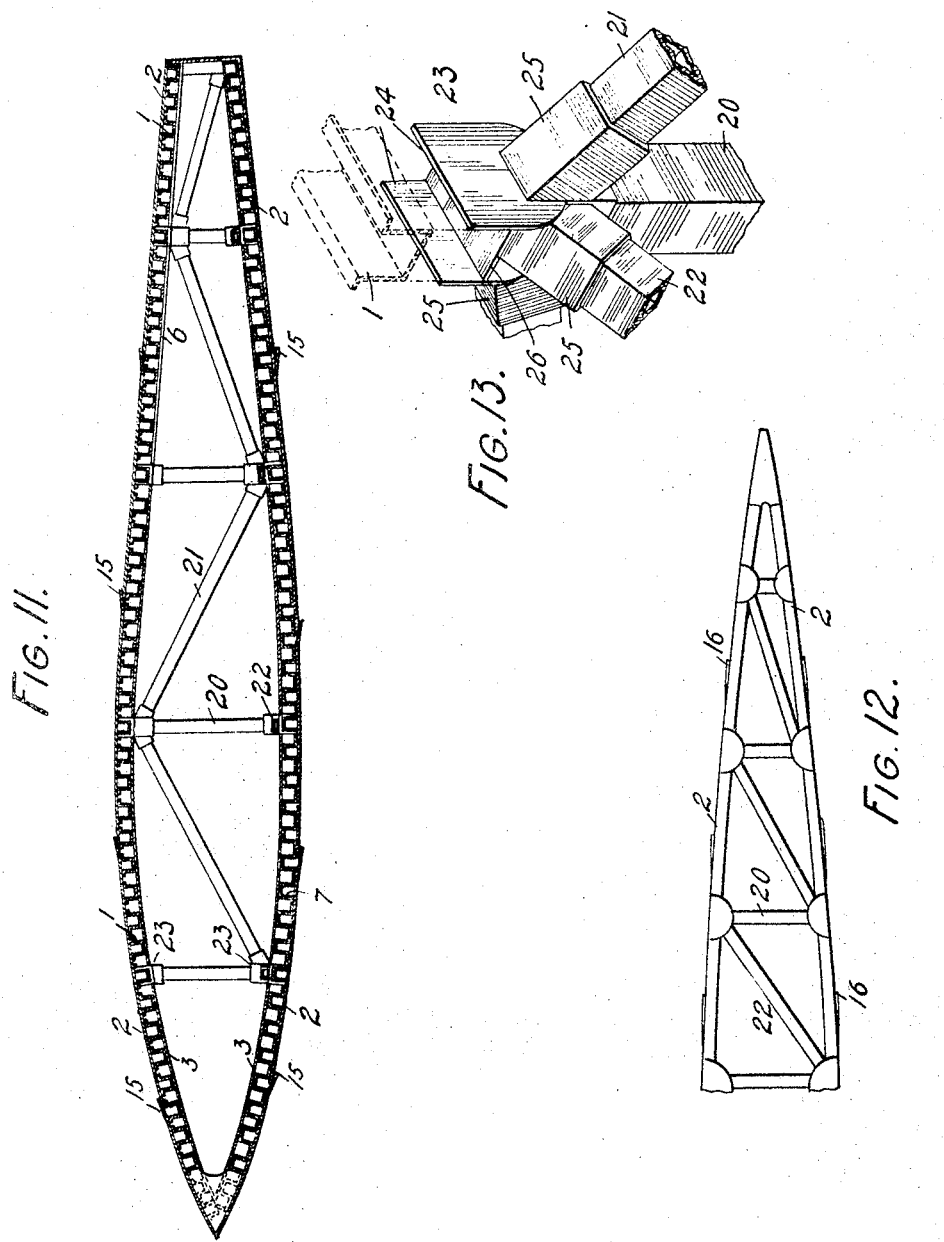

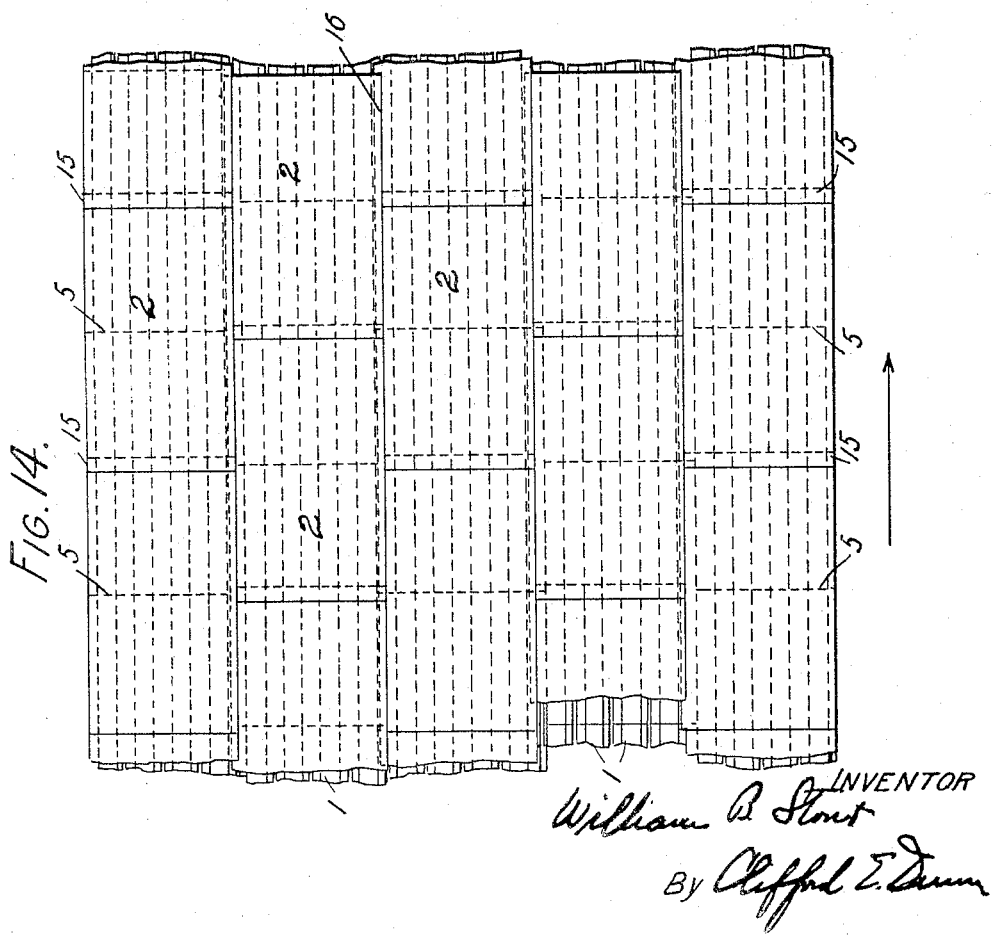

Patented Jan. 26, 1932

1,842,736

UNITED STATES PATENT OFFICE

WILLIAM B. STOUT, OF DETROIT, MICHIGAN, ASSIGNOR TO FORD MOTOR COMPANY, OF HIGHLAND PARK, MICHIGAN

AIR AND WATER CRAFT AND METHOD OF MAKING THE SAME

Application filed December 23, 1918, Serial No. 268,046. Renewed January 17, 1928.

My invention contemplates an improved structure for use in any place where great strength to weight ratio is desirable, and a method of building up such improved structure.

While I specifically described this improved structure for use in aircraft, I wish it to be distinctly understood that I do not limit myself to improvements in aircraft only. The structure may be employed to advantage in other places, such for instance, in building up the shells of boats, automobile bodies, etc.

Airplanes now in use comprise many metal and solid wooden parts to afford them rigidity. These parts being heavy add much to the load that must be maintained in the air during flight. By my improved construction I am enabled to considerably diminish the weight of the machine by employing light sheet materials assembled so as to be comparatively inflexible. I do not thereby, however, sacrifice rigidity of the finished structure. I am also able to build all of the exposed parts as wings, ailerons, etc. of the machine of this strong but light material which may withstand much greater strain than the present construction having a wing covering of fabric.

It is also an object of my invention to provide a method of assembling the various parts of the structure, such as shell, fuselage, wings, wing covering, body, rudders, etc. from sheet material. As an example of a suitable material, I will mention ply-wood, and use this as an illustration in describing the invention. This material comprises a plurality of very thin sheets of wood glued or otherwise firmly secured together, the grain of the adjacent sheets of wood running at right angles to each other. As a securing means for the several sheets comprising the ply-wood, I prefer to use casein glue of suitable character, such for instance as that sold on the market under the trade name of Certus glue. This glue or cement I have also found to be extremely useful and effective in securing together the several parts of the structure, as it not only forms a very strong cement, but one which is water proof as well. Of course other modes of securing the elements together could be used, as glue would not be the most satisfactory method of joining sheet metal. The various parts of the structure may be separately produced and then readily assembled in a fashion suitable for quantity production.

A further object of my invention is to provide a structure of the aforementioned parts whose strength is not seriously impaired by rupture of a portion thereof, accidental or otherwise. This object is obtained by my improved structure as the individual parts comprising the whole are so inter-related that they support one another in a great many places.

A further object of my invention is to provide such craft with a very smooth outer surface, supported or reinforced at substantially all points from within, thereby permitting greater load per square foot of exposed surface.

A further object of my invention is to provide such a craft with light weight reinforcing members, as struts, etc., coupled to the light weight frame through the agency of sheet metal parts.

Other objects will be obvious to those skilled in the art from reading of the following description taken with the drawings, in which Fig. 1 shows a sheet of suitable material and a mechanism for forming the sheet to make an element.

Fig. 2 shows one mode of building up the structure.

Fig. 3 shows a different mode of building up the structure similar to the finished structure obtained from the method shown in Fig. 2.

Fig. 4 is a view showing a square column member.

Fig. 5 shows another mode of building up a structure in which the deformed part is made from a continuously corrugated sheet.

Fig. 6 shows in section a wing of the ordinary type of airplane built up from my improved structure.

Figures 7 to 10 show other cross sections using sheet material.

Fig. 11 is a fore and aft section through an airplane body showing the mode of bracing and assembling.

Fig. 12 is a transverse section showing the transverse bracing.

Fig. 13 is a detached view in perspective of a typical joint between the interior bracing and the shell, and Fig. 14 is a plan showing the mode of overlapping and staggering the joints in my improved structure.

Referring to the drawings, I show in Fig. 1 a flat sheet of material A which may be passed through rolls B to form a channel-like structure C. I show in this figure a mere diagrammatic showing, as it is understood that other shapes of rolls or different devices may be used to produce various shapes of finished units. Instead of the channel shown at C, I may use Z bars, triangles, angles, etc.

In Fig. 2 I show a mode of building up an extensive structure wherein the forms 4 are suitably placed apart. These forms are provided with a series of notches 4', and in these notches I place a plurality of members 1, which in this case are channels. These members are here shown as being of equal length and staggered in end to end relation, as shown at 5—5. When the channels have been assembled in the forms as shown, a large sheet 2 is glued, or otherwise suitably fastened to the upper surface of the channels. In Fig. 3 I show a modification of this method in which the sheet 2 is held next to the form 4" and the channel members placed upon the opposite face of the sheet 2, also in staggered relation, and strips 6 for reinforcing the structure are shown as glued, or otherwise suitably fastened, to the exposed surfaces of the channels. It is understood that in both of the forms shown, in Figs. 2 and 3 the sheet 2 is firmly glued to the channels 1 along the contiguous faces.

Referring to Fig. 5 I show there also a modified structure in which the outer smooth sheets 2 and 3 are glued to a corrugated sheet 7. This figure also shows the type of material which I have found to be satisfactory in use. It consists of three ply wood veneer of about $\frac{1}{16}$ of an inch in thickness. I find that this material when built up as described has exceedingly great strength to weight ratio. The type of structure in Fig. 5 I find to be well adapted to build up the wings of airplanes, as shown in Fig. 6. A suitable sheet of ply-wood may be passed through a set of rollers to give it the desired contour, and sheets 2 and 3 glued to the corrugations to form a smooth envelope.

Referring to Fig. 7, I show there another modification, wherein the outer smooth sheets 2 and 3 and a series of Z bars 8 are assembled to form a cellular structure. In this form the sheets 2 and 3 are glued, or otherwise suitably fastened, to the legs 9 and 10 of the Z bars.

I may improve this structure by offsetting similarly shaped Z bars at their corners as shown in Fig. 8 at 11. This structure gives a lap joint between the consecutive Z bars.

In Fig. 9 I have shown a honeycomb like structure made up of hexagonal sections 12 which are united along contiguous faces 13, and are glued to the outer sheets 2 and 3 as before.

In Fig. 10 I show a still stronger structure in which the triangular shaped units 14 are used between the outer and inner sheets 2 and 3. These triangular pieces are glued, or otherwise suitably fastened, together along their contiguous faces 13' and to the outer sheets 2 and 3, as previously described. This structure has greater strength in shear than the other structures shown. It is also a heavier structure.

In Fig. 11, wherein I have shown a fore and aft section through the body or wing of an airplane, I show the channels 2 with the smooth outer and inner sheets 2 and 3 in the upper left part of this figure. I vary the outer construction and show to the right the use of the strips 6 instead of the sheet 3. The bottom surface is shown to be made up of the corrugated structure similar to that as shown in Fig. 5. I also show a system of fore and aft bracing which comprises columns 20 and struts 21.

In Fig. 12 I have shown in the transverse section a system of bracing which comprises the vertical columns 20 and other struts 22. These columns and struts may be built up of material similar to that as used in the sheets 2 and 3, which may be ply-wood or other suitable sheet material and a typical one is shown in Fig. 4. These columns and struts may be attached to the channel member 1 in the fashion shown in Figs. 11 and 13. In the latter figure I show a sheet metal or ply-wood device 23 comprising two flat plates 24 which are adapted to fit the sides of the channel member and a plurality of tubular extensions 25 adapted to surround the ends of the struts and columns. I show here merely a typical one of these devices and it is to be understood that the exact shape will depend upon the proportioning of the structure which is being reinforced.

In Fig. 14, I have shown schematically, an improved mode of building up a large structure. As previously described I prefer to stagger the strips 1 in end to end relation. Where it is desired to build up a surface larger than can be conveniently made from one sheet 2, I use a plurality of sheets 2—2, staggering their joints in the fashion shown at 15 and 16. These joints 15 and 16 are lap joints and in the fore and aft direction are preferably lapped in as shown in Fig. 11 in section and the arrow in Fig. 14. The transverse lap joints are indicated at 16 in Fig. 12. A large wing as in Fig. 6, if built so as to require more than one pair of sheets 2—3 may be provided with lap joints 17 and 18. Locating the joints as above set forth minimizes the resistance offered by the air to the passage of the plane.

I find that a structure made up of this corrugated or deformed ply-wood used to brace outer sheets of ply-wood produces a very satisfactory surface for use in aircraft, and that the outer surface is very smooth and can be made to conform to any desired outline. The structure is extremely strong and sets well in place when assembled. While it is made of this extremely light material, it stands rough usage and accidents with a minimum of injury.

Having thus described my invention and a few of the many forms in which it may find embodiment, I desire it to be distinctly understood that I do not desire to be limited to the exact showing which is to be interpreted in an illustrative sense only.

I claim:

1. As an article of manufacture an airplane wing comprising a skin providing a sustaining surface and a rigidifying structure within said skin and comprising a plurality of members U-shaped in cross section and having their arms adjacent their upper portions bent to extend in opposite directions.

2. As an article of manufacture an airplane wing comprising a skin providing a sustaining surface and a rigidifying structure within said skin and comprising a plurality of members U-shaped in cross section and having their arms adjacent their upper portions bent to extend in opposite directions, the bodies of said members comprising a plurality of layers of veneer wood.

3. The method of assembling a structure which consists in placing in a form a plurality of similarly deformed strips of sheet material, the ends of said strips being staggered with respect to one another, placing a smooth sheet of similar material alongside and fastening the parts together.

WILLIAM B. STOUT.